(12) United States Patent
Okaji et al.

(10) Patent No.: US 8,371,586 B2
(45) Date of Patent: Feb. 12, 2013

(54) BEARING SEAL AND MOLD ASSEMBLY FOR FORMING SUCH BEARING SEAL

(75) Inventors: Yoshitaka Okaji, Kawachinagano (JP); Eiichi Urakami, Osaka (JP)

(73) Assignees: NTN Corporation, Osaka (JP); Nakanishi Metal Works, Co., Ltd., Osaka (JP)

( * ) Notice: Subject to any disclaimer, the term of this patent is extended or adjusted under 35 U.S.C. 154(b) by 393 days.

(21) Appl. No.: 12/865,151

(22) PCT Filed: Feb. 4, 2009

(86) PCT No.: PCT/JP2009/051849
§ 371 (c)(1),
(2), (4) Date: Jul. 29, 2010

(87) PCT Pub. No.: WO2009/099085
PCT Pub. Date: Aug. 13, 2009

(65) Prior Publication Data
US 2010/0327538 A1 Dec. 30, 2010

(30) Foreign Application Priority Data
Feb. 5, 2008 (JP) .................................. 2008-025049

(51) Int. Cl.
*F16J 15/32* (2006.01)
(52) U.S. Cl. ........................ 277/562; 277/572; 277/549
(58) Field of Classification Search .................. 277/549, 277/562, 572
See application file for complete search history.

(56) References Cited

FOREIGN PATENT DOCUMENTS

| JP | 45-27129 | 10/1970 |
| JP | 46-17653 | 5/1971 |
| JP | 52-121547 | 9/1977 |
| JP | 61-189367 | 8/1986 |

OTHER PUBLICATIONS

International Search Report issued Mar. 31, 2009 in International (PCT) Application No. PCT/JP2009/051849.

*Primary Examiner* — Gilbert Lee
(74) *Attorney, Agent, or Firm* — Wenderoth, Lind & Ponack, LLP.

(57) ABSTRACT

A bearing seal includes a metal core having a radially outer portion engaged in an inner seal groove of a bearing outer race. The core includes a bent portion engaged in the seal groove, a radially outer flange extending inwardly from an end of the bent portion located inside the bearing, a tapered tubular portion having a large-diameter end thereof connected to a small-diameter end of the outer flange and a small-diameter end thereof located axially outwardly of its large-diameter end, and a radially inner flange extending inwardly from the small-diameter end of the tubular portion. A rubber seal is fixed to an inner surface of the metal core that faces the interior of the bearing. The rubber seal includes a thick-walled portion having an inner radial step, and formed with three lips that elastically contact the inner race outer surface. The thick-walled portion includes a small-diameter thick-walled portion.

13 Claims, 3 Drawing Sheets

(I)

(II)

BEARING SEAL AND MOLD ASSEMBLY FOR FORMING SUCH BEARING SEAL

TECHNICAL FIELD

This invention relates to a bearing seal for sealing the bearing space of a rolling bearing, and a mold assembly for forming such a bearing seal.

BACKGROUND ART

FIG. 4(I) shows a known bearing seal for sealing the bearing space of a rolling bearing. This bearing seal comprises a metal core 21 and a rubber seal 31 fixed to the metal core 21.

The metal core 21 comprises a bent portion 22 press-fitted in a seal groove 41 formed in the radially inner surface of an outer race 40 of a bearing at each end portion thereof, a radially outer flange 23 extending radially inwardly from the end of the bent portion 22 located inside of the bearing, a tapered tubular portion 24 having its large-diameter end connected to the small-diameter end of the radially outer flange 23 and its small-diameter end located axially outwardly of its large-diameter end, and a radially inner flange 25 extending radially inwardly from the small-diameter end of the tapered tubular portion 24. The tapered tubular portion 24 is bent at point 24a such that its large-diameter portion 24b located radially outwardly of the bent point 24a has a tapered angle α2 relative to the axis that is larger than the tapered angle β2 of the small-diameter portion 24c located radially inwardly of the bent point 24a.

The rubber seal 31 is fixed to the inner surface of the metal core 21 facing the interior of the bearing by vulcanization and covers the area of the metal core 21 from the bent portion 22 to an intermediate portion of the radially inner flange 25, and has a thick-walled portion 32 covering the inner surface of the small-diameter portion 24c. Three lips, i.e. an inner lip 33, an intermediate lip 34 and an outer lip 35 are formed on the radially inner surface of the thick-walled portion 32 so as to be axially spaced from each other.

In this bearing seal, with the bent portion 22 press-fitted in the seal groove 41 formed in the radially inner surface of the outer race 40 at its end, the tips of the three lips 33, 34 and 35 of the rubber seal 31 are elastically in contact with the cylindrical radially outer surface 43 of the inner race 42 while bent outwardly of the bearing. Thus, this bearing seal shows extremely high grease sealability, dust-proof properties and waterproofness. Also, the radially inner flange 25 prevents foreign objects having large diameters such as sand from colliding against the outer lip 35, thus preventing damage to the outer lip 35. This improves the durability of the bearing seal.

DISCLOSURE OF THE INVENTION

Object of the Invention

With this conventional bearing seal, the radially inner portion of the inner surface radially inner flange 25 is not covered by the rubber seal 31 and exposed. Also, because the inner lip 33, intermediate lip 34 and outer lip 35 are thin, they tend to get ripped during mold release after molding. Thus, as shown in FIG. 4(II), it is necessary to use a mold assembly comprising three separate molds, i.e. a lower mold A, an upper mold B and a core C.

With this three-piece mold assembly, as in the case with an ordinary two-piece mold assembly comprising a lower mold and an upper mold, it is impossible to leave the finished bearing seal in the lower mold A, workability is extremely poor and the manufacturing cost is high.

An object of the present invention is to provide a bearing seal which can be formed easily and still shows as good sealability as conventional bearing seals, and a mold assembly for forming such a bearing seal.

Means to Achieve the Object

In order to achieve this object, this invention provides a bearing seal comprising a metal core having a radially outer portion configured to be engaged in a seal groove formed in a radially inner surface of an outer race of a bearing at its end portion, and a rubber seal fixed to an inner surface of the metal core that faces the interior of the bearing, wherein the metal core comprising a bent portion configured to be engaged in the seal groove, a radially outer flange extending radially inwardly from an end of the bent portion located inside of the bearing, a tapered tubular portion having a large-diameter end thereof connected to a small-diameter end of the radially outer flange and a small-diameter end thereof located axially outwardly of its large-diameter end, and a radially inner flange extending radially inwardly from the small-diameter end of the tapered tubular portion, wherein the rubber seal covers the area of the metal core from the bent portion to an intermediate portion of the radially inner flange and includes a thick-walled portion covering the inner surface of the tapered tubular portion, the thick-walled portion having on a radially inner surface thereof three axially spaced apart seal lips configured to be elastically brought into contact with a radially outer surface of an inner race of the bearing, wherein the thick-walled portion includes a cylindrical small-diameter thick-walled portion extending axially outwardly from an outermost one of the three lips and covering a radially inner surface of the radially inner flange, and wherein the rubber seal further includes a thin-walled outer surface covering portion connected to the small-diameter thick-walled portion and covering the outer surface of the radially inner flange.

The present invention also provides a mold assembly for forming the bearing seal, comprising a lower mold having a recess formed in an abutment surface thereof, and a lower core formed on a bottom surface of the recess for forming the small-diameter thick-walled portion, an upper mold which can be opened and closed and having an upper core for forming the radially inner surface of the thick-walled portion of the rubber seal and the three lips, the upper core being formed on an abutment surface of the upper mold which is configured to be brought into abutment with the abutment surface of the lower mold, wherein a tapered set surface is formed on the inner periphery of the recess for closely contacting and supporting the outer periphery of the tapered tubular portion of the metal core when the metal core is inserted with the radially inner flange facing downward, wherein the lower mold further includes a support surface extending from a large-diameter end of the set surface for supporting the radially outer flange, and an insertion groove formed in the abutment surface of the lower mold for receiving another end portion of the bent portion of the metal core, wherein a cavity for forming the seal member is defined between the metal core set in the lower mold and the upper mold when the upper mold is closed.

When forming the bearing seal using this mold assembly, the metal core and unvulcanized rubber material are set in the lower mold, and the upper mold is closed to form the rubber seal.

When setting the metal core, the metal core is inserted into the recess of the lower mold with its radially inner flange facing downward, the outer end portion of the bent portion is inserted into the insertion groove, and the outer periphery of the tapered tubular portion is brought into close contact with the set surface, with the radially outer flange supported by the support surface.

When the upper mold is opened after forming the rubber seal, tensile force is applied to the rubber seal through the three lips. But since the small-diameter thick-walled portion, which covers the radially inner surface of the radially inner flange, has a large thickness, and the outer surface covering portion encloses the radially inner flange, the rubber seal never peels off the metal core, and the finished product is left in the lower mold. The finished product is then pushed upward by moving an ejector provided in the lower mold, and removed from the lower mold.

An annular groove is preferably formed in the radially inner surface of the small-diameter thick-walled portion to extend along the outer surface of the outer lip. With this arrangement, the outer lip has a radial length that is substantially equal to the radial lengths of the other two lips, so that the contact pressures of the respective lips against the inner race pressure are also substantially equal to each other. This prevents the outer lip from becoming worn to a higher degree than the other lips due to contact with the inner race.

Preferably, the difference in radius between the inner diameter of the radially inner flange and the inner diameter of the annular groove is set to be 0.1 mm or over and 1.0 mm or under, or the difference in radius between the inner diameter of the annular groove and the inner diameter of the small-diameter thick-walled portion is set to be 0.1 mm or over and 1.0 mm or under, and further the axial length of the small-diameter thick-walled portion from its outer end surface to the annular groove is set to be larger than the thickness of any of the three lips. With this arrangement, the rigidity of the rubber seal increases. Also, when releasing the upper mold, the small-diameter thick-walled portion engages the annular portion of the lower mold, thus preventing separation of the finished product. This makes it possible to reliably leave the finished product in the lower mold.

Advantages of the Invention

With the bearing seal according to the present invention, since the thick-walled portion includes a cylindrical small-diameter thick-walled portion extending axially outwardly from an outermost one of the three lips and covering a radially inner surface of the radially inner flange, and the rubber seal further includes a thin-walled outer surface covering portion connected to the small-diameter thick-walled portion and covering the outer surface of the radially inner flange, the rigidity of the rubber seal increases, and the coupling force of the rubber seal to the metal core increases. This makes it possible to form the bearing seal using a two-piece mold assembly comprising a lower mold and an upper mold, thus reducing the production cost.

With the bearing seal mounted in a bearing, the tips of the three lips are elastically in contact with the cylindrical radially outer surface of the inner race. Thus, this bearing seal shows extremely high grease sealability, dust-proof properties and waterproofness as with conventional bearing seals. Further, the small-diameter thick-walled portion, which covers the radially inner surface of the radially inner flange, prevents foreign objects having large diameters such as sand from colliding against the outer lip. This improves durability of the lips.

BRIEF DESCRIPTION OF THE DRAWINGS

FIG. 4(I) is a sectional view of a conventional bearing seal.

DESCRIPTION OF THE NUMERALS

Figure 1:
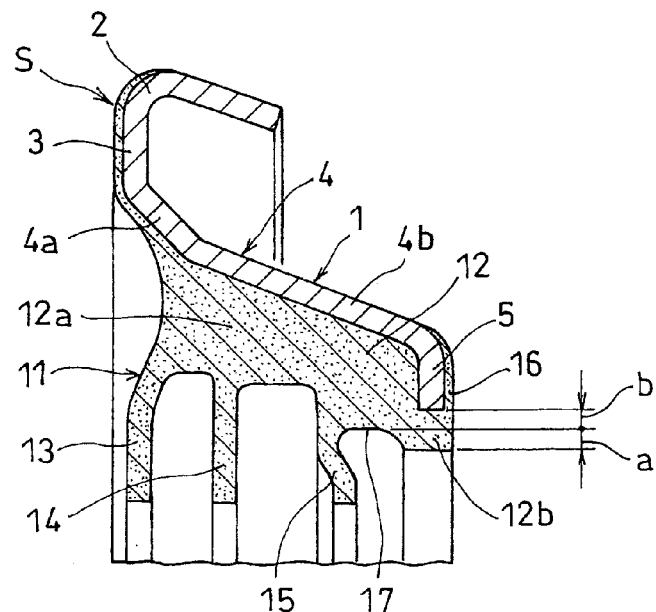
FIG. 1 is a sectional view of a bearing seal embodying the present invention.

1. Metal core
2. Bent portion
3. Radially outer flange
4. Tapered tubular portion
5. Radially inner flange
11. Rubber seal
12. Thick-walled portion
12b. Small-diameter thick-walled portion
13. Inner lip
14. Intermediate lip
15. Outer lip
16. Outer surface covering portion
17. Annular groove
40. Outer race
41. Seal groove

BEST MODE FOR EMBODYING THE INVENTION

Now the embodiment of the present invention is described with reference to FIGS. 1 to 3. As shown in FIG. 1, the bearing seal S embodying the present invention comprises a metal core 1 and a rubber seal 11 fixed to the metal core 1.

The metal core 1 is formed by pressing a thin steel sheet. The metal core 1 comprises a bent portion 2 press-fitted in a seal groove 41 formed in the radially inner surface of an outer race 40 of a bearing shown in FIG. 2 at its end portion, a radially outer flange 3 extending radially inwardly from the end of the bent portion 2 located inside of the bearing, a tapered tubular portion 4 having its large-diameter end connected to the small-diameter end of the radially outer flange 3 and its small-diameter end located axially outwardly of its large-diameter end, and a radially inner flange 5 extending radially inwardly from the small-diameter end of the tapered tubular portion 4.

The tapered tubular portion 4 comprises a large-diameter tapered portion 4a and a small-diameter tapered portion 4b. The large-diameter tapered portion 4a has a taper angle α1 relative to the axis which is larger than the taper angle β1 of the small-diameter tapered portion 4b relative to the axis.

The rubber seal 11 is fixed to the inner surface of the metal core 1 facing the interior of the bearing by vulcanization and covers the area of the metal core 1 from the bent portion 2 to the outer surface of the radially inner flange 5.

The rubber seal 11 has a thick-walled portion 12 covering the inner surface of the tapered tubular portion 4 and having radial steps on its radially inner surface. An inner lip 13, an intermediate lip 14 and an outer lip 15 are formed on the radially inner surface of the large-diameter thick-walled portion 12a, which covers the large-diameter end portion of the small-diameter tapered portion 4b so as to be axially spaced from each other.

The rubber seal 11 further includes an outer surface covering portion 16 integrally connected to the end of the small-diameter thick-walled portion 12b extending from the outer lip 15 to the radially inner surface of the radially inner flange 5, and covering the outer surface of the radially inner flange 5.

An annular groove 17 is formed in the radially inner surface of the small-diameter thick-walled portion 12b to extend along the outer side surface of the outer lip 15. If the annular groove 17 has an inner diameter larger than the inner diameter of the radially inner flange 5, it becomes impossible to remove the finished product from a lower mold with an ejector. If the step between the annular groove 17 and the small-diameter thick-walled portion 12b is not sufficiently large, it is impossible to leave the finished product in the lower mold. But if this step is too large, the small-diameter thick-walled portion has to be radially expanded excessively, which makes it difficult to remove the finished product from the lower mold using an ejector, without e.g. developing cracks.

The difference a in radius between the inner diameter of the annular groove 17 and the inner diameter of the small-diameter thick-walled portion 12b is set to be 0.1 mm or over and 1.0 mm or less. The difference in radius between the inner diameter of the annular groove 17 and the inner diameter of the radially inner flange 5 is also set to be 0.1 mm or over and 1.0 mm or less.

If the axial length L of the small-diameter thick-walled portion 12b from its outer end surface to the annular groove 17 is shorter than the thickness of any of the three lips 13, 14 and 15, too, it may be impossible to leave the finished product in the lower mold. Thus, the axial length L of the small-diameter thick-walled portion 12b from its outer end surface to the annular groove 17 is set to be longer than the thickness of any of the three lips 13, 14 and 15.

Figure 2:
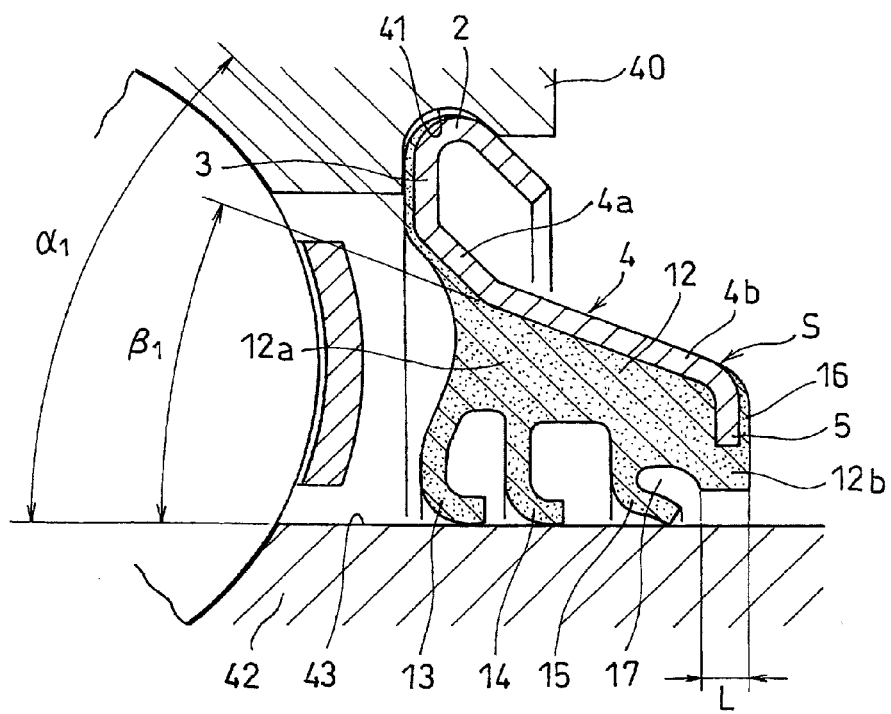
FIG. 2 is a sectional view of the bearing seal shown in FIG. 1 when mounted in a rolling bearing.

As shown in FIG. 2, this bearing seal S is mounted in position by press-fitting the bent portion 2 into the seal groove 41 formed in the radially inner surface of the outer race 40 at its end portion, with the tips of the three lips 13, 14 and 15 elastically in contact with the cylindrical radially outer surface 43 of the inner race 42 while being bent outwardly, thereby sealing the interior of the bearing.

Since this bearing seal S is mounted with the tips of the inner lip 13, intermediate lip 14 and outer lip 15 elastically in contact with the cylindrical radially outer surface 43 of the inner race 42, this bearing seal shows extremely high grease sealability, dust-proof properties and waterproofness as with conventional bearing seals.

The small-diameter thick-walled portion 12b, which covers the radially inner surface of the radially inner flange 5, prevents foreign objects having large diameters such as sand from colliding against the outer lip 15, thus preventing damage to the outer lip 15.

Figure 3:
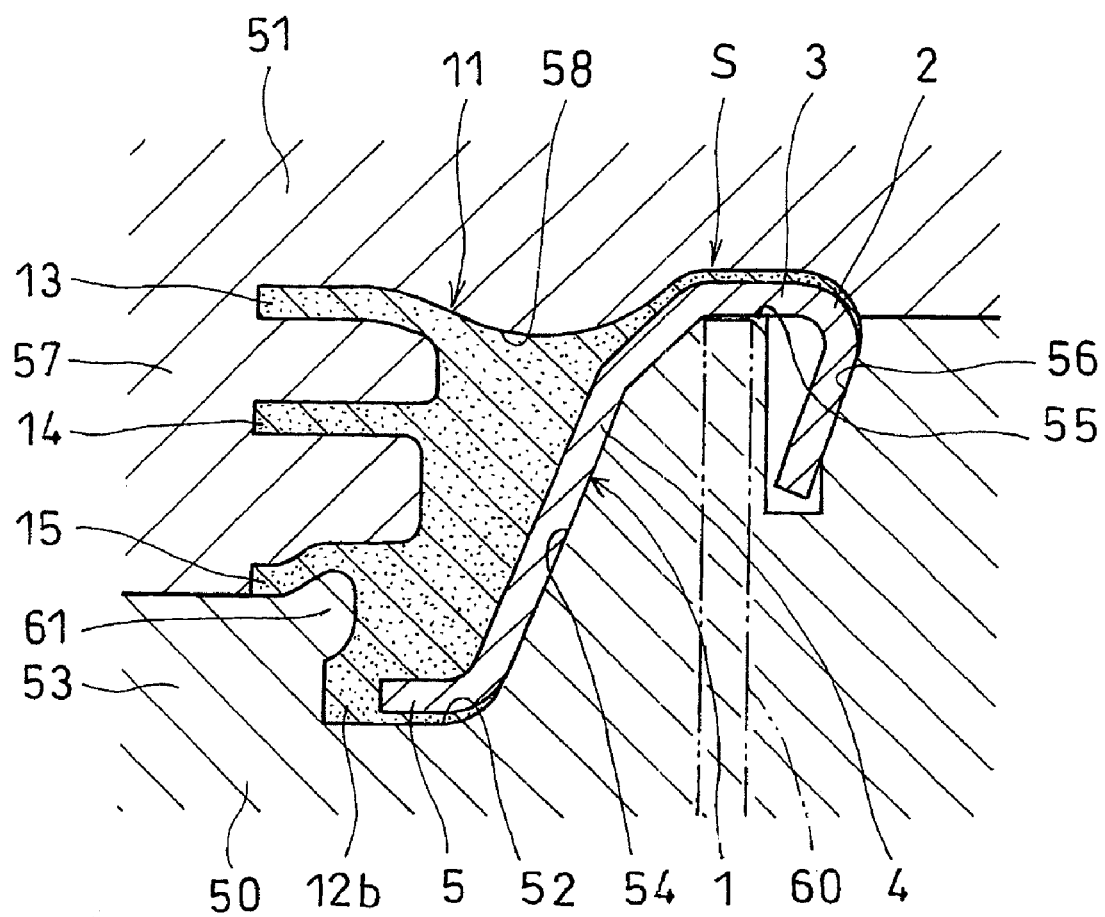
FIG. 3 is a sectional view of a mold assembly for forming the bearing seal.
Figure 4:
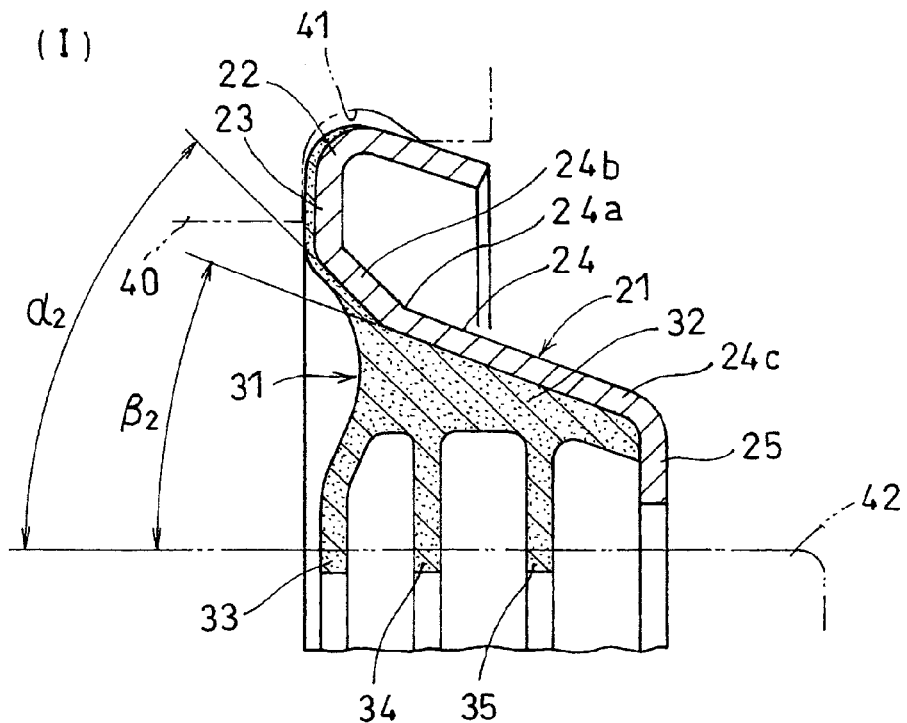
FIG. 4(II) is a mold assembly for forming this bearing seal.
Figure 4:
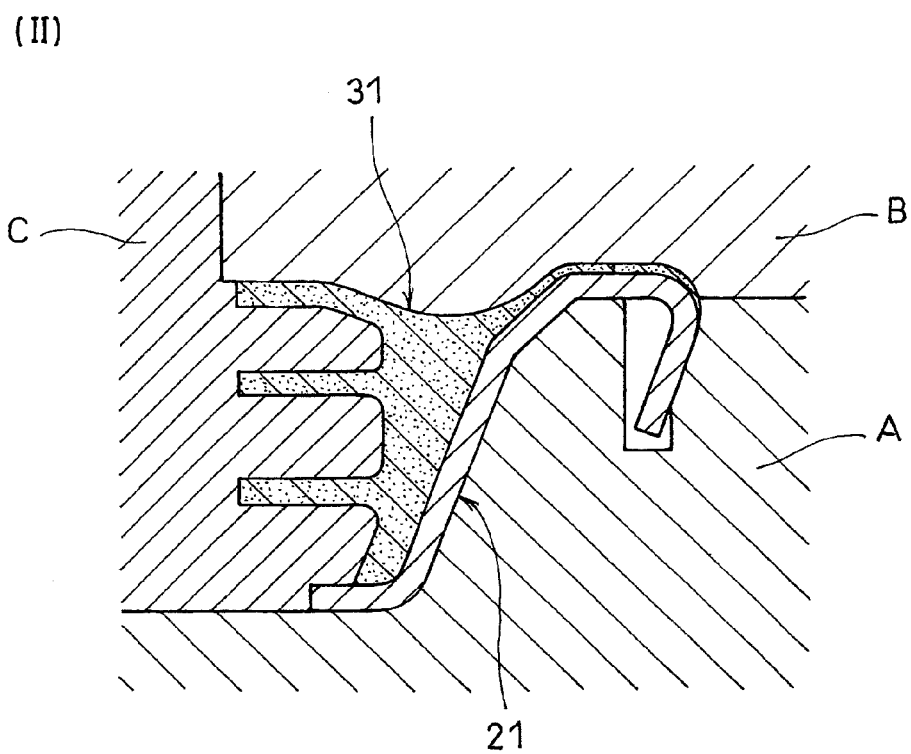

FIG. 3 shows a mold assembly for forming the above-described bearing seal S. This mold assembly comprises a lower mold 50 and an upper mold 51 provided over the lower mold 50. The upper mold 51 can be opened and closed relative to the lower mold 50.

The lower mold 50 has a recess 52 in its abutment surface that abuts on the upper mold 51. A lower core 53 is formed on the bottom surface of the recess 52 for forming the radially inner surface of the small-diameter thick-walled portion 12b.

A tapered set surface 54 is formed on the inner periphery of the recess 52 for closely contacting and supporting the outer periphery of the tapered tubular portion 4 of the metal core 1, which is inserted with the radially inner flange 5 facing downward. The lower mold further includes a support surface 55 extending from the large-diameter end of the set surface 54 for supporting the radially outer flange 3, and an insertion groove 56 formed along the outer periphery of the support surface 55 into which the outer end portion of the bent portion 2 of the metal core 1 is inserted.

An upper core 57 is formed on the abutment surface of the upper core 51 that abuts on the lower core 50 for forming the radially inner surface of the thick-walled portion 12 of the rubber seal 11 and its lips 13, 14 and 15. By closing the upper mold 51, a cavity 58 is defined between the lower mold 50 and the upper mold 51 for forming the seal member.

When forming the bearing seal using this mold assembly, the metal core 1 and unvulcanized rubber material are set in the lower mold 50, and the upper mold 51 is closed to form the rubber seal 11.

When setting the metal core 1, the metal core 1 is inserted into the recess 52 of the lower mold 50 with its radially inner flange 5 facing downward, the outer end portion of the bent portion 2 is inserted into the insertion groove 56, and the outer periphery of the tapered tubular portion 4 is brought into close contact with the set surface 54, with the radially outer flange 3 supported by the support surface 55.

When the upper mold 51 is opened after forming the rubber seal 11, tensile force is applied to the rubber seal 11 through the three lips 13, 14 and 15. But since the small-diameter thick-walled portion 12b, which covers the radially inner surface of the radially inner flange 5, has a large thickness, and the outer surface covering portion 16 encloses the radially inner flange 5, the rubber seal 11 never peels off the metal core 1. When releasing the upper mold 51, the small-diameter thick-walled portion 12b engages an annular portion 61 of the lower mold 50, thereby preventing separation of the finished product. The finished product is thus left in the lower mold 50. The finished product is then pushed upward by moving an ejector 60 in the axial direction as shown by chain line in FIG. 3, and removed from the lower mold 50.

Since the bearing seal S can be formed by a mold assembly comprising the separate lower and upper molds 50 and 51, it can be formed at a low cost.

What is claimed is:

1. A bearing seal comprising a metal core having a radially outer portion configured to be engaged in a seal groove formed in a radially inner surface of an outer race of a bearing at its end portion, and a rubber seal fixed to an inner surface of the metal core that faces the interior of the bearing, wherein said metal core comprising a bent portion configured to be engaged in the seal groove, a radially outer flange extending radially inwardly from an end of the bent portion located inside of the bearing, a tapered tubular portion having a large-diameter end thereof connected to a small-diameter end of the radially outer flange and a small-diameter end thereof located axially outwardly of its large-diameter end, and a radially inner flange extending radially inwardly from the small-diameter end of the tapered tubular portion, and wherein said rubber seal covers the area of the metal core from the bent portion to an intermediate portion of the radially inner flange and includes a thick-walled portion covering the inner surface of the tapered tubular portion, said thick-walled portion having on a radially inner surface thereof three axially spaced apart seal lips configured to be elastically brought into contact with a radially outer surface of an inner race of the bearing, characterized in that the thick-walled portion includes a cylindrical small-diameter thick-walled portion extending axially outwardly from an outermost one of the three lips and covering a radially inner surface of the radially inner flange, and that the rubber seal further includes a thin-walled outer surface covering portion connected to the small-diameter thick-walled portion and covering the outer surface of the radially inner flange.

2. The bearing seal of claim 1 wherein an annular groove is formed in a radially inner surface of the small-diameter thick-walled portion to extend along an outer surface of the outermost one of the three lips.

3. The bearing seal of claim 2 wherein the difference in radius between the inner diameter of the radially inner flange and the inner diameter of the annular groove is 0.1 mm or over and 1.0 mm or under.

4. The bearing seal of claim 3 wherein the difference in radius between the inner diameter of the annular groove and the inner diameter of the small-diameter thick-walled portion is 0.1 mm or over and 1.0 mm or under.

5. The bearing seal of claim 3 wherein the axial length of the small-diameter thick-walled portion from its outer end surface to the annular groove is larger than the thickness of any of the three lips.

6. A mold assembly for forming the bearing seal of claim 3, the mold assembly comprising a lower mold having a recess formed in an abutment surface thereof, and a lower core formed on a bottom surface of the recess for forming the small-diameter thick-walled portion, an upper mold which can be opened and closed and having an upper core for forming the radially inner surface of the thick-walled portion of the rubber seal and the three lips, said upper core being formed on an abutment surface of the upper mold which is configured to be brought into abutment with the abutment surface of the lower mold, wherein a tapered set surface is formed on the inner periphery of the recess for closely contacting and supporting the outer periphery of the tapered tubular portion of the metal core when the metal core is inserted with the radially inner flange facing downward, wherein the lower mold further includes a support surface extending from a large-diameter end of the set surface for supporting the radially outer flange, and an insertion groove formed in the abutment surface of the lower mold for receiving another end portion of the bent portion of the metal core, wherein a cavity for forming the seal member is defined between the metal core set in the lower mold and the upper mold when the upper mold is closed.

7. The bearing seal of claim 2 wherein the difference in radius between the inner diameter of the annular groove and the inner diameter of the small-diameter thick-walled portion is 0.1 mm or over and 1.0 mm or under.

8. The bearing seal of claim 7 wherein the axial length of the small-diameter thick-walled portion from its outer end surface to the annular groove is larger than the thickness of any of the three lips.

9. A mold assembly for forming the bearing seal of claim 7, the mold assembly comprising a lower mold having a recess formed in an abutment surface thereof, and a lower core formed on a bottom surface of the recess for forming the small-diameter thick-walled portion, an upper mold which can be opened and closed and having an upper core for forming the radially inner surface of the thick-walled portion of the rubber seal and the three lips, said upper core being formed on an abutment surface of the upper mold which is configured to be brought into abutment with the abutment surface of the lower mold, wherein a tapered set surface is formed on the inner periphery of the recess for closely contacting and supporting the outer periphery of the tapered tubular portion of the metal core when the metal core is inserted with the radially inner flange facing downward, wherein the lower mold further includes a support surface extending from a large-diameter end of the set surface for supporting the radially outer flange, and an insertion groove formed in the abutment surface of the lower mold for receiving another end portion of the bent portion of the metal core, wherein a cavity for forming the seal member is defined between the metal core set in the lower mold and the upper mold when the upper mold is closed.

10. The bearing seal of claim 2 wherein the axial length of the small-diameter thick-walled portion from its outer end surface to the annular groove is larger than the thickness of any of the three lips.

11. A mold assembly for forming the bearing seal of claim 10, the mold assembly comprising a lower mold having a recess formed in an abutment surface thereof, and a lower core formed on a bottom surface of the recess for forming the small-diameter thick-walled portion, an upper mold which can be opened and closed and having an upper core for forming the radially inner surface of the thick-walled portion of the rubber seal and the three lips, said upper core being formed on an abutment surface of the upper mold which is configured to be brought into abutment with the abutment surface of the lower mold, wherein a tapered set surface is formed on the inner periphery of the recess for closely contacting and supporting the outer periphery of the tapered tubular portion of the metal core when the metal core is inserted with the radially inner flange facing downward, wherein the lower mold further includes a support surface extending from a large-diameter end of the set surface for supporting the radially outer flange, and an insertion groove formed in the abutment surface of the lower mold for receiving another end portion of the bent portion of the metal core, wherein a cavity for forming the seal member is defined between the metal core set in the lower mold and the upper mold when the upper mold is closed.

12. A mold assembly for forming the bearing seal of claim 2, the mold assembly comprising a lower mold having a recess formed in an abutment surface thereof, and a lower core formed on a bottom surface of the recess for forming the small-diameter thick-walled portion, an upper mold which can be opened and closed and having an upper core for forming the radially inner surface of the thick-walled portion of the rubber seal and the three lips, said upper core being formed on an abutment surface of the upper mold which is configured to be brought into abutment with the abutment surface of the lower mold, wherein a tapered set surface is formed on the inner periphery of the recess for closely contacting and supporting the outer periphery of the tapered tubular portion of the metal core when the metal core is inserted with the radially inner flange facing downward, wherein the lower mold further includes a support surface extending from a large-diameter end of the set surface for supporting the radially outer flange, and an insertion groove formed in the abutment surface of the lower mold for receiving another end portion of the bent portion of the metal core, wherein a cavity for forming the seal member is defined between the metal core set in the lower mold and the upper mold when the upper mold is closed.

13. A mold assembly for forming the bearing seal of claim 1, the mold assembly comprising a lower mold having a recess formed in an abutment surface thereof, and a lower core formed on a bottom surface of the recess for forming the small-diameter thick-walled portion, an upper mold which can be opened and closed and having an upper core for forming the radially inner surface of the thick-walled portion of the rubber seal and the three lips, said upper core being formed on an abutment surface of the upper mold which is configured to be brought into abutment with the abutment surface of the lower mold, wherein a tapered set surface is formed on the inner periphery of the recess for closely contacting and supporting the outer periphery of the tapered tubular portion of the metal core when the metal core is inserted with the radially inner flange facing downward, wherein the lower mold further includes a support surface extending from a large-diameter end of the set surface for supporting the radially outer flange, and an insertion groove formed in the abutment surface of the lower mold for receiving another end portion of the bent portion of the metal core, wherein a cavity for forming the seal member is defined between the metal core set in the lower mold and the upper mold when the upper mold is closed.

* * * * *